United States Patent
Leite

(10) Patent No.: US 6,250,446 B1
(45) Date of Patent: Jun. 26, 2001

(54) CLUTCH ASSEMBLY

(75) Inventor: Matthew Joseph Leite, Plymouth, MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/432,353

(22) Filed: Nov. 2, 1999

(51) Int. Cl.[7] ............................ F16D 23/06; F16D 11/14
(52) U.S. Cl. ............................ 192/53.35; 192/69.91; 192/85 A
(58) Field of Search .................. 192/53.35, 69.91, 192/85 A, 53.3

(56) References Cited

U.S. PATENT DOCUMENTS

| | | | |
|---|---|---|---|
| 2,392,762 | * | 1/1946 | Peterson et al. ............... 192/53.35 |
| 3,025,674 | * | 5/1962 | Peras ........................... 192/53.35 |
| 3,679,033 | * | 7/1972 | Wagner ........................ 192/53.4 |
| 4,069,803 | * | 1/1978 | Cataldo ....................... 192/85 A X |
| 4,131,185 | * | 12/1978 | Schall ......................... 192/85 A X |
| 5,377,800 | * | 1/1995 | Sperduti et al. ............. 192/53.3 X |
| 6,027,422 | * | 2/2000 | Yamazaki ..................... 192/53.36 X |

* cited by examiner

Primary Examiner—Rodney H Bonck
(74) Attorney, Agent, or Firm—Ford Global Tech., Inc.

(57) ABSTRACT

A clutch assembly 10 is provided and includes a clutch housing 12 which provides an output torque, and a clutch hub 16 which provides an input torque. Housing 12 and hub 16 each respectively include splined portions 52 and 40. Assembly 10 includes a frictional member which is coupled to housing 12 and which selectively and operatively engages hub 16 effective to cause the rotational speeds of housing 12 and hub 16 to become substantially equal. Assembly 10 further includes a member 22 having a splined portion 26 which is selectively movable to a position in which splined portion 26 is engaged with both splined portion 52 and splined portion 40, thereby providing a mechanical link between housing 12 and hub 16.

18 Claims, 2 Drawing Sheets

CLUTCH ASSEMBLY

FIELD OF THE INVENTION

This invention relates to a clutch assembly and more particularly, to a hydraulic clutch assembly having interlocking splines which operatively couple a first or "clutch input" member to a second or "clutch output" member.

BACKGROUND OF THE INVENTION

Clutch assemblies are typically and operatively utilized within a vehicle and are mounted between the vehicle's engine and the vehicle's power train. These clutch assemblies are, more particularly, used to allow the engine and the power train to be operatively interconnected, thereby allowing for the transfer of torque and power between the engine and the power train.

One type of clutch assembly, known as a "friction clutch", utilizes paper friction and two or more field separator plates or members which are selectively forced or pressed together in order to transfer torque and power between the engine and the power train. The members are typically and selectively engaged and disengaged (i.e., forced together and released) by use of a hydraulic actuator or assembly. While these types of clutches are effective to transmit and/or communicate torque and power between the engine and the vehicle power train, they suffer from some drawbacks.

For example and without limitation, the "holding power" of these clutch assemblies (e.g. the ability of the engaged plates to remain engaged) is dependent upon and/or is limited by the coefficient of friction which exists between the engaged friction plates or members. These prior clutch assemblies have a relatively limited torque capacity and can only be used to transfer limited amounts of torque and power between the engine and the power train. Furthermore, the engaged surfaces of the plates or members wear over time, thereby resulting in an undesirable variation in the force or hydraulic pressure required to engage and/or disengage the clutch. This variation adversely effects a vehicle's "ride" and performance and, for example and without limitation, undesirably causes the vehicle to "jerk", vibrate, and/or shake during gearshifts.

There is therefore a need for a new and improved vehicle clutch assembly which overcomes many, if not all, of the previously delineated drawbacks of such prior vehicle clutch assemblies.

SUMMARY OF THE INVENTION

It is a first object of the invention to provide a clutch assembly which overcomes at least some of the previously delineated drawbacks of prior clutch assemblies.

It is a second object of the invention to provide a clutch assembly which physically and/or "mechanically" links or couples a clutch "input member" to a "clutch output member".

It is a third object of the invention to provide a clutch assembly which utilizes a hydraulic piston or actuating assembly to selectively engage a pair of members by use of intermeshing teeth or splines.

It is a fourth object of the invention to provide a clutch assembly having improved static torque capacity.

According to a first aspect of the present invention, a clutch assembly is provided and includes a first member which is selectively rotatable at a first speed, the first member having a first portion, and a second member, which is selectively rotatable at a second speed, the second member having a second portion. A third member is provided, is coupled to the second member, and is selectively rotatable at the second speed. The third member is movable from a first position in which the third member is remotely positioned from first member to a second position in which the third member contacts the first member, the contact between the third member and the first member being effective to cause the second speed to become substantially equal to the first speed. A fourth member is disposed between the first and the second member and has a third portion. The fourth member is movable, when the first speed is substantially equal to the second speed, to a third position, in which the third portion is intermeshed with both the first portion and the second portion, thereby selectively and mechanically linking the first member to the second member.

According to a second aspect of the present invention, a method for transferring torque between a first movable member rotating at a first speed and a second movable member rotating at a second speed, is provided. The method includes the steps of: forming a first splined portion upon the first member; forming a second splined portion upon the second member; providing a third member having a frictional surface; coupling the third member to the second member; providing a fourth member having a third splined portion; disposing the third member between the first member and the second member; selectively moving the third member to a position in which the frictional surface contacts the first member effective to cause the second speed to become equal to the first speed; and selectively moving the fourth member to a third position in which the third splined portion is intermeshed with both the first splined portion and the second splined portion, thereby selectively and mechanically linking the first member to the second member and transferring torque between the first member and the second member.

These and other features, aspects, and advantages of the invention will become apparent by reading the following specification and by reference to the following drawings.

DETAILED DESCRIPTION OF THE PRFERRED EMBODIMENT OF THE INVENTION

Figure 1:
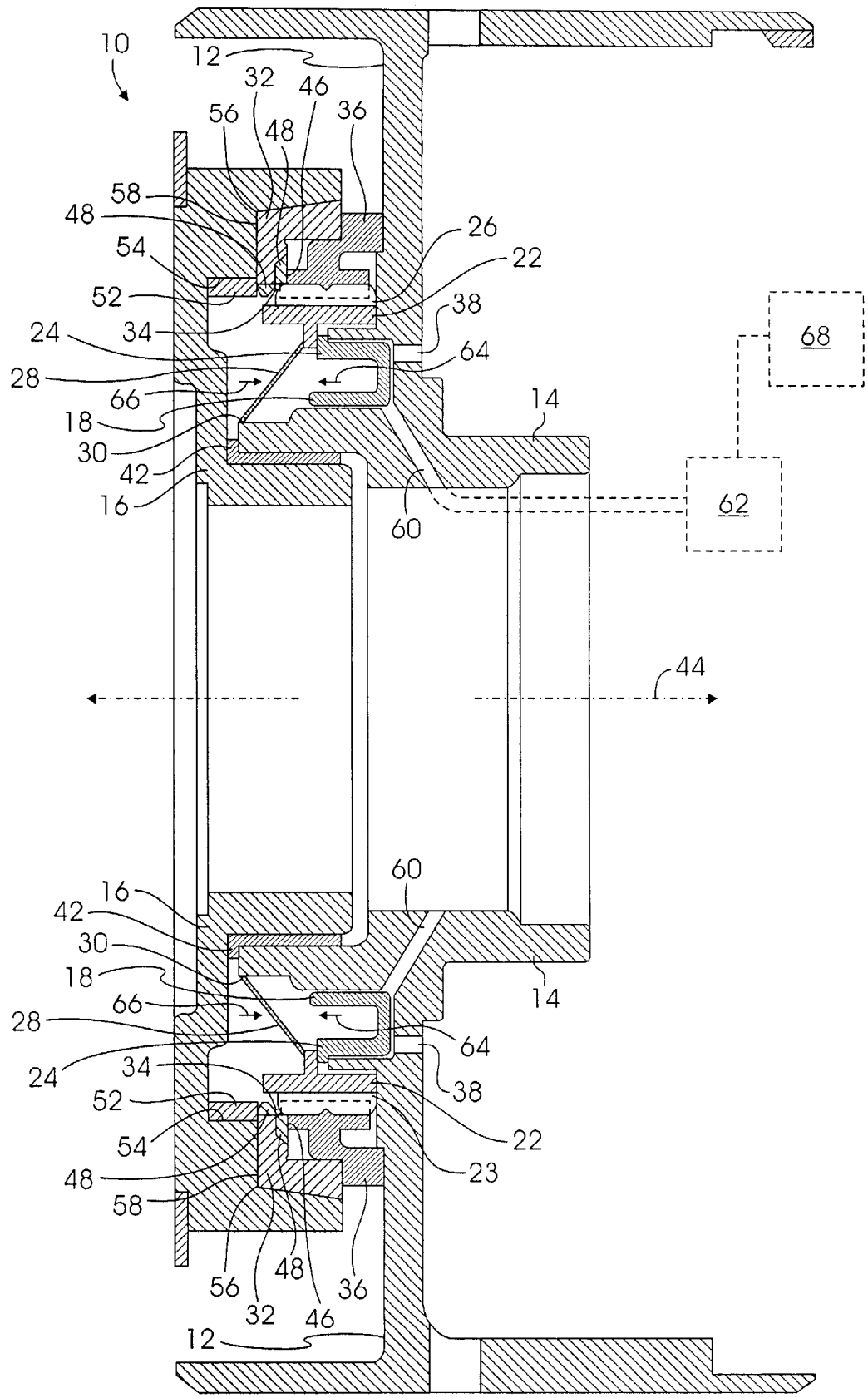
FIG. 1 is a longitudinal cross sectional view of a clutch assembly which is made in accordance with the teachings of the preferred embodiment of the invention and illustrating the clutch assembly in a disengaged state.
Figure 2:
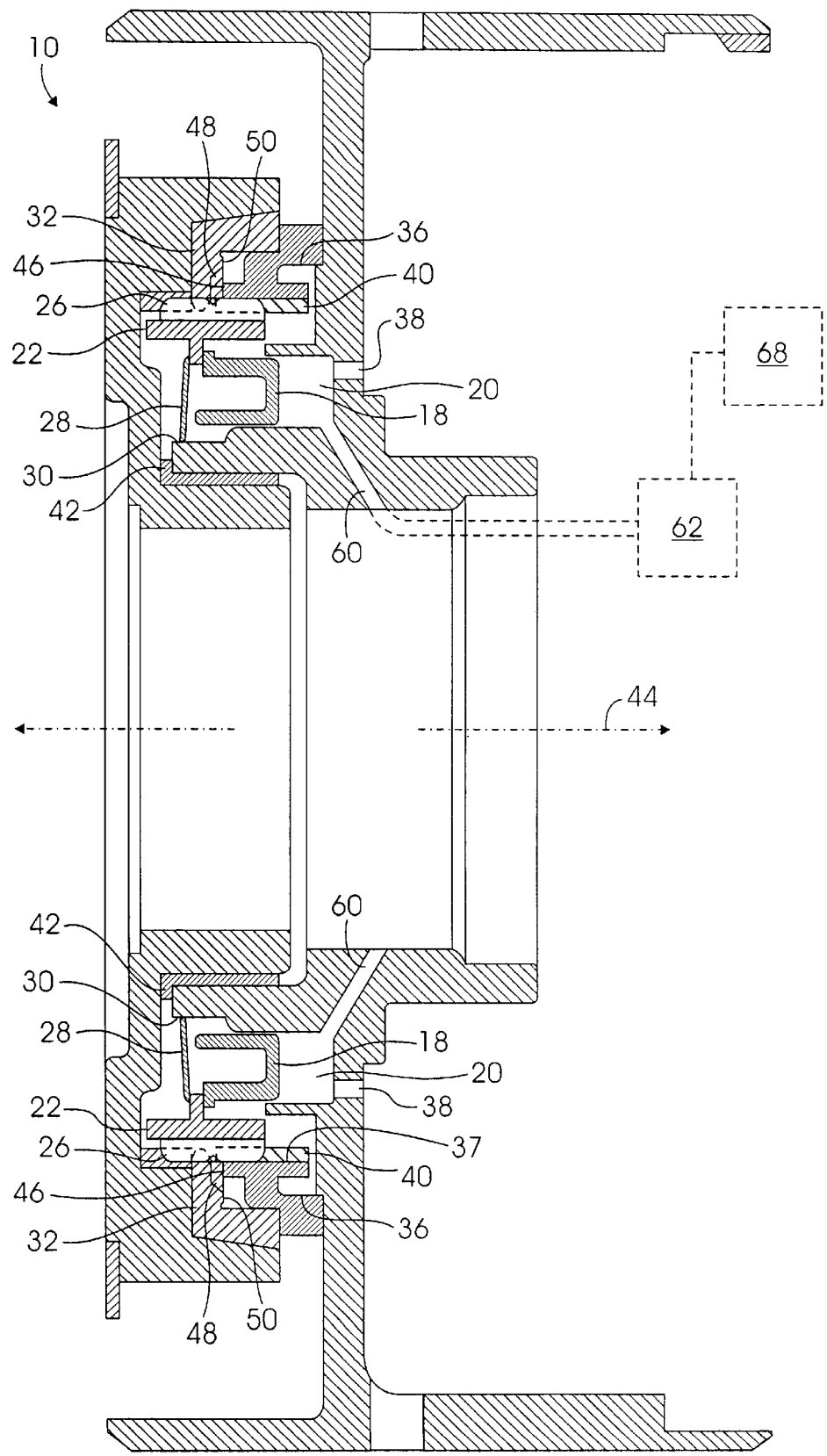
FIG. 2 is longitudinal cross sectional view of the clutch assembly shown in FIG. 1 and illustrating the clutch assembly in an engaged state.

Referring now to FIGS. 1 and 2, there is shown a clutch assembly 10 which is made in accordance with the teachings of the preferred embodiment of the invention and which is adapted for use within a vehicle of the type having an engine which operatively provides torque and power (i.e., "input" torque and power), and a drive train which is adapted to receive the torque provided by the engine. While the following discussion relates to a clutch assembly for use within a vehicle, it should be appreciated that assembly 10 may be used in virtually any other apparatus, device, or assembly in which torque is desired to be transferred between two selectively rotating members.

Clutch assembly 10 includes a generally round and/or cylindrical clutch housing or member 12 which provides and/or which communicates torque and power (i.e., "output torque") to the vehicle's drive train (not shown) and which has an integrally formed and centrally disposed drum or portion 14, and a clutch hub or member 16 which operatively receives the torque and power from the vehicle's engine (not shown). In this manner, as in more fully delineated below, assembly 10 selectively transfers and/or communicates the received torque and power from the engine to the drive train.

Assembly 10 further includes a generally circular piston or member 18 which is movably retained within an annular groove 20 which is integrally formed within drum 14, and a synchronizer "sleeve" or member 22 having a splined portion 26 (e.g., a plurality of integrally formed teeth or "splines") which is circumferentially formed on the outer surface 23 of member 22. Member 22 abuts the top outer edge 24 of piston 18, and is further operatively coupled to a generally circular return spring or member 28, which in one non-limiting embodiment comprises a "Belleville-type" spring. A "snap ring" 30 holds spring member 28 in place. Clutch assembly 10 further includes a synchronizing "blocker" or member 32 which is disposed between housing 12 and hub 16, and a generally circular energizing ring or spring 34 which resides between blocker 32 and sleeve 22.

Housing 12 is preferably made from a relatively durable, strong, and rigid material, and in one non-limiting embodiment is made from conventional and commercially available iron or steel. Housing 12 includes a hub synchronizer or member 36 which is fixedly attached to housing 12 and which includes a splined portion 40 (e.g. a plurality of teeth or "splines") which is circumferentially formed on the inner surface 37 of member 36, and which is physically and operatively intermeshed and/or interlocked with splined portion 26 of sleeve 22. Member 36 further includes a second splined portion 46 which, in one non-limiting embodiment, is disposed at an approximate ninety degree angle with respect to splined portion 40, and which is physically and operatively intermeshed and/or interlocked with splined portion 48 which is integrally formed on the inner surface 50 of blocker 32.

Housing 12 further includes a conventional hydraulic fluid and/or gas release valve 38, which in one non-limiting embodiment comprises a "ball-type" check or "bleed" valve.

Drum portion 14 of housing 12 includes a conventional bushing or bearing 42 which is abuttingly and rotatably disposed between member 16 and drum 14 and which allows member 16 and drum 14 to rotate relative to one another about the longitudinal axis of symmetry 44 of assembly 10. Drum portion 14 further includes a hydraulic fluid input aperture 60 which operatively receives and delivers pressurized hydraulic fluid from a conventional hydraulic system or assembly 62 which is selectively and operatively controlled by the vehicle's on board computer or control module 68 in a conventional manner.

Member 16 includes a splined portion 52 (e.g. a plurality of teeth or splines) which is integrally and circumferentially formed upon surface 54 of member 16, and a frictional surface 56 which in one non-limiting embodiment comprises a conventional and commercially available frictional coating which is bonded to member 16, such as friction paper.

Blocker 32 includes an outer frictional surface 58 which is adapted to mate with surface 56, and in one non-limiting embodiment comprises a conventional and commercially available frictional coating which is bonded to blocker 32, such as conventional friction paper.

In operation, hub 16 is operatively coupled to the vehicle's engine (not shown) and spins at a rate or speed which is provided by the vehicle's engine. Housing 12 is operatively coupled to the vehicle's drive train and, prior to engagement with hub 16, spins independently of hub 16 and typically spins at a lower rate or speed than hub 16 and may possibly spin in the opposite direction of hub 16. When the vehicle's control module 68 determines that housing 12 and hub 16 are to be engaged, hydraulic assembly 62 provides a flow of pressurized hydraulic fluid through aperture 60 and into groove 20. The pressure of the provided fluid causes valve 38 to close, thereby causing pressure to "build" or increase behind piston 18. As the pressure of the hydraulic fluid "builds" or increases behind piston 18, piston 18 moves in the direction illustrated by arrow 64. As piston 18 moves, synchronizer sleeve 22 is forced in the direction of arrow 64 and spring 28 is compressed. The force on sleeve 22 is transferred through the energizing spring 34 to blocker 32, thereby causing blocker 32 to move from being remotely positioned from hub 16 to a position in which it is frictionally engaged with hub 16. Particularly, the force provided by sleeve 22 causes blocker 32 and surface 58 of blocker 32 to be frictionally engaged with surface 56 of member 16.

The engagement between the frictional surfaces 56 and 58 causes the speed of housing 12 to be "synchronized with", or become substantially equivalent to, the speed of hub 16. Particularly, because blocker 32 is splined together with member 36, which is fixedly coupled to housing 12, the frictional engagement between blocker 32 and hub 16 causes the speed of housing 12 and hub 16 to be substantially "synchronized" (i.e., to become substantially equal).

As pressure continues to increase within groove 20, sleeve 22 continues to move in the direction of arrow 64, thereby causing splines 26 to slide past spring 34 and to cooperatively engage with and/or intermesh with splines 48 of blocker 32. Sleeve 22 continues to move in the direction of arrow 64, thereby causing splines 26 to be engaged with splines 52 of clutch hub 16, as shown in FIG. 2, and completing engagement of the clutch housing 12 to the clutch hub 16. Once engaged, torque is fully transferred between housing 12 and hub 16 by way of the cooperatively intermeshed splined members 16, 22, and 36. In this manner, housing 12 and hub 16 are mechanically linked together by way of cooperatively intermeshing splines or teeth, thus providing a substantially higher torque capacity than a conventional frictional surface linkage. Furthermore, due to the mechanical linkage between housing 12 and hub 16, frictional surfaces 56, 58 are not required to "hold" or maintain the link between housing 12 and hub 16, thereby substantially reducing the overall wear of the frictional surfaces 56, 58 and substantially increasing the "working" or "operating" life of the clutch assembly 10.

Clutch assembly 10 is disengaged by hydraulic assembly 62 which selectively terminates the flow of pressurized fluid through aperture 60. As the pressure of the hydraulic fluid is decreased, valve 38 is opened, thereby causing the fluid within groove 20 to be exhausted through valve 38. As the fluid flows out of groove 20, spring 28 forces sleeve 22 and piston 18 to move in the direction of arrow 66 and back into their respective original position, as shown in FIG. 1, thereby disengaging the mechanical link between housing 12 and hub 16.

It is to be understood that the invention is not to be limited to the exact construction and/or method which has been illustrated and discussed above, but that various changes and/or modifications may be made without departing from the spirit and the scope of the invention.

What is claimed is:

1. A clutch assembly comprising:
   a first member which is selectively rotatable at a first speed and having a first portion;
   a second member which is selectively rotatable at a second speed and having a second portion;
   a third member coupled to said second member and which is selectively rotatable at said second speed and having a third portion, said third member being selectively movable from a first position in which said third member is remotely positioned from said first member to a second position in which said third member contacts said first member, said contact between said third member and said first member being effective to cause said second speed to become substantially equal to said first speed; and
   a fourth member disposed between said first and said second member and having a fourth portion, said fourth member being selectively movable, when said first speed becomes substantially equal to said second speed, to a third position in which said fourth portion intermeshes with said first portion, said second portion, and said third portion thereby selectively and intermeshingly connecting said first member to said second member to said third member.

2. The clutch assembly of claim 1 wherein said third member comprises a frictional surface which engages said first member while said third member resides in said second position.

3. The clutch assembly of claim 1 wherein said first, said second and said third portions are splined.

4. The clutch assembly of claim 1 further comprising a hydraulic piston which is disposed between said first member and said second member and which is effective to cause said fourth member to move to said third position.

5. The clutch assembly of claim 4 wherein said hydraulic piston is further adapted to cause said third member to move between said first position and said second position.

6. The clutch assembly of claim 4 further comprising a spring which is coupled to said fourth member and which is effective to cause said fourth member to move out of said third position.

7. A clutch assembly comprising:
   a hub which is selectively rotatable at a first speed and having a first splined portion;
   a housing which is selectively rotatable at a second speed and having a second splined portion;
   a first member disposed between said hub and said housing, said first member including a frictional surface and a third splined portion which is intermeshed with said second splined portion, thereby causing said first member to be operatively coupled to said housing and to rotate at said second speed; and
   a second member having a fourth splined portion, said second member being movable between a first position, a second position, and a third position, said movement of said second member from said first to said second position being effective to cause-said frictional surface of said first member to frictionally engage said hub thereby causing said second speed to become substantially equal to said first speed, said movement of said second member from said second position to said third position being effective to cause said fourth splined portion to be mated with both said first splined portion and said second splined portion, thereby connecting said hub to said housing.

8. The clutch assembly of claim 7 wherein said clutch assembly is adapted for use in combination with a vehicle having an engine which is operatively coupled to said hub.

9. The clutch assembly of claim 8 wherein said vehicle further comprises a drive train which is operatively coupled to said housing.

10. The clutch assembly of claim 7 further comprising a hydraulically movable third member which is disposed between said housing and said second member, said movement of said hydraulically movable third member being effective to cause said second member to move between said first, said second, and said third positions.

11. The clutch assembly of claim 10 further comprising a spring which is coupled to said second member and which is effective to cause said second member to move from said third position to said first position.

12. The clutch assembly of claim 7 wherein said housing is made from steel.

13. The clutch assembly of claim 7 wherein said hub further comprises a frictional surface which mates with said frictional surface of said first member.

14. The clutch assembly of claim 7 wherein said frictional surface comprises friction paper which is bonded to said first member.

15. A method for transferring torque between a first movable member rotating at a first speed and a second movable member moving at a second speed, said method comprising the steps of :
   disposing a first splined portion upon said first member;
   disposing a second splined portion upon said second member;
   providing a third member having a frictional surface and a third splined portion;
   coupling said third member to said second member;
   providing a fourth member having a fourth splined portion;
   disposing said third member between said first member and said second member;
   selectively moving said third member from a first position in which said frictional surface is positioned remotely from said first member to a second position in which said frictional surface contacts said first member effective to cause said second speed to become equal to said first speed; and
   selectively moving said fourth member from a third position in which said fourth splined portion intermeshes with said second splined portion, to a fourth position in which said fourth splined portion is intermeshed with said first splined portion, said second splined portion, and said third splined portion, thereby selectively and mechanically linking said first member to said second member and transferring to torque between said first member and said second member.

16. The method of claim 15 further comprising the steps of:
   providing a hydraulic assembly; and
   operatively coupling said hydraulic assembly to said third member, thereby selectively causing said third member to move between said first and said second position.

17. The method of claim 15 further comprising the steps of:
   providing a hydraulic assembly; and
   operatively coupling said hydraulic assembly to said fourth member, thereby selectively causing said fourth member to move between said third and said fourth position.

18. The method of claim 17 further comprising the steps of:
   providing a spring; and
   operatively coupling said spring to said fourth member, thereby selectively causing said fourth member to move from said fourth position to said third position.

* * * * *